United States Patent [19]

Patterson

[11] Patent Number: 5,042,675
[45] Date of Patent: Aug. 27, 1991

[54] CONTAINER PRESSURE RELEASE VENT

[75] Inventor: Gregory A. Patterson, Vancouver, Canada

[73] Assignee: Ballard Battery Systems Corporation, North Vancouver, Canada

[21] Appl. No.: 520,089

[22] Filed: May 4, 1990

[51] Int. Cl.[5] .............................................. F16K 17/40
[52] U.S. Cl. .................................. 220/89.1; 220/207; 222/397; 429/56; 429/82
[58] Field of Search ..................... 220/89.1, 89.2, 207, 220/367; 222/397; 429/56, 82

[56] References Cited

U.S. PATENT DOCUMENTS

| 3,292,826 | 12/1966 | Abplanalp | 220/89.1 X |
| 3,831,822 | 8/1974 | Zundel | 220/89.1 X |
| 4,484,691 | 11/1984 | Lees | 220/89.1 |
| 4,698,282 | 10/1987 | Mantello | 220/207 X |

Primary Examiner—Steven M. Pollard
Attorney, Agent, or Firm—Barrigar & Oyen

[57] ABSTRACT

This invention pertains to a novel pressure relief device for a container which is under pressure or becomes pressurized. In one aspect, the invention is directed to a pressure relief vent for a battery which, due to adverse chemical reaction, may become pressurized to a hazardous level. A pressure release vent for a container comprising: (a) a container having a wall; (b) an indentation formed in said wall, the indentation being interrupted by a flat-topped fold which extends across the indentation and reduces the depth of the indentation at a specific location; and (c) a score formed in said fold, the score providing a point of weakness whereby excessive pressure buildup in the container ruptures the container wall at the score location, thereby permitting pressurized gases to escape from the container.

13 Claims, 4 Drawing Sheets

THICKNESS OF CONTAINER WALL UNDER SCORE LINE, INCHES×$10^{-3}$

THICKNESS OF CONTAINER WALL UNDER SCORE (INCHES×$10^{-3}$)
BBS PRV

CONTAINER PRESSURE RELEASE VENT

FIELD OF THE INVENTION

This invention pertains to a novel pressure relief device for a container which is under pressure or becomes pressurized. In one aspect, the invention is directed to a pressure relief vent for a battery which, due to adverse chemical reaction, may become pressurized to a hazardous level.

BACKGROUND OF THE INVENTION

Pressurized containers are widely used for a number of purposes such as: storage of gases such as oxygen, nitrogen, natural gas and propane; pressure packaging and dispensing consumer products such as paints, lacquers, varnishes, food products, hair spray, deodorants, shaving lather, insecticides and herbicides; and packaging for electrochemical cells. The pressurized containers used for pressure packaging and dispensing consumer products are typically aerosol containers which contain a consumer product which is mixed with a propellant gas such as freon or methyl chloride.

Pressurized containers are potentially dangerous because an explosion can result upon overpressurization. Overpressurization can result when a container is overfilled. More frequently, however, overpressurization occurs when the container and its contents are subjected to elevated temperatures during incineration or by storage at unacceptably high temperatures. Overpressurization can also occur as the result of unwanted chemical reactions taking place within the container. This situation can occur in a sealed storage battery which releases gases internally upon overcharge or overdischarge. To provide a safety measure, lithium batteries are enclosed in a casing which contains a pressure release vent. The vent releases on overpressure and prevents any possibility of accidental explosion. Many lithium batteries utilize sulfur dioxide as an electrolyte component. Such a battery desirably has a vent that releases at pressure above about 350 psi.

Willis U.S. Pat. No. 3,918,610, Nov. 11, 1975, discloses a safety vent for a pressurized container which comprises an integral concavity in the container wall, an integral hollow bridge interrupting the concavity, and a weakening score line in the container wall extending across the hollow bridge. When excessive pressure builds up in the container, it acts to stress the bridge. This results in a fracture of the residual container wall under the weakening score line. The pressurized contents vent through the fracture. The approach set forth by Willis is not entirely satisfactory because consistent quality control is difficult to achieve. In the Willis vent, the wall thickness under the score line is a critical parameter if operation is to reliably take place at a predetermined pressure range. Thickness tolerances for proper venting are therefore undesirably small. With the Willis vent, during the manufacturing process, the score is put into the container while it is flat. Subsequently, as concavities and bridges are formed in the container, the score becomes stretched by the forming process.

A. Romero U.S. Pat. No. 4,601,959, July 22, 1986, discloses a metal casing for a pressurized container which is hermetically sealed and has a thin wall portion. The casing contains a vent which ruptures when internal casing pressure exceeds a given value. The vent includes at least one vent-forming rib projecting outwardly from a circular end wall. The rib has formed therein a vent-forming groove which extends transversely along a portion of the length of the rib. Thus, the groove ends are spaced a certain predetermined distance from the base of the rib.

Romero's design has a disadvantage in that the groove does not extend to the rib base on each side, thereby restricting the size of the vent hole that opens when excessive pressure builds up in the casing and a crack propagates in the groove. It is advantageous to have a large vent opening to permit quick release of pressure, and to minimize blockage of the opening due to salts or other impeding particles that may be contained in the container. Romero's reason for having the groove not extend to the bottom of the base is to minimize corrosion (see col. 2, lines 14–31).

Gregory A. Patterson et. al., U.S. Pat. No. 4,610,370, Sept. 9, 1986, discloses a pressure release vent for a container. The container has in a wall thereof an indentation which is interrupted by a scored hollow rib. The rib has an apex which connects the opposite side walls of the indentation at a distance above the bottom of the indentation. This pressure release vent works reasonably well, but it has a number of factors which bear improvement. The opening which is created by the pressure release vent upon fracture is only of pinhole size and hence gas pressure is not expelled quickly. Moreover, since the vent opening is pinhole size, salts or other solid objects in the container tend to jam the opening, thereby impeding the efficient operation of the vent opening. A further problem is that while the pressure release vent is intended to release at pressures of about 450 psig, it is difficult to maintain a high degree of quality control. Unless high quality dies are used, consistent quality control is vulnerable to die wear. In some cases the vent may not release until pressures of 750 psig are reached.

J. A. Oswald, U.S. Pat. No. 4,789,608, Dec. 6, 1988, discloses a pressure venting device for a battery casing which includes two semi-circular concavities extending upwardly from the bottom surface of the casing. Two oppositely disposed bridges interrupt the concavities. Two score lines are disposed laterally and offset inboard from the bridges. Oswald alleges that since the scores are formed in a flat area of the bottom surface of the battery casing and are not affected by subsequent rib stamping procedures, venting will occur consistently at a predetermined pressure range. Oswald emphasizes that quality control is an important objective in forming battery casing pressure venting devices which have a release point within a consistent relatively narrow range.

SUMMARY OF THE INVENTION

The invention is directed to a pressure release vent for a container comprising: (a) a container having a wall; (b) an indentation formed in said wall, the indentation being interrupted by a flat-topped fold which extends across the indentation and reduces the depth of the indentation at a specific location; and (c) a score formed in said fold, the score providing a point of weakness whereby excessive pressure buildup in the container ruptures the container wall at the score location, thereby permitting pressurized gases to escape from the container.

In the pressure release vent, the container may have a cylindrical wall and at one end thereof a circular planar base, the periphery of which joins with the edge of the cylindrical wall around its circumference. The indentation may be formed in the circular base and may be in the form of an annular groove formed in the circular base. The annular groove may be radially inboard of the circumference of the base and may have a generally V-shaped cross-section. The end of the cylindrical container opposite the base may be closed with a circular planar disk which joins with the free end of the cylindrical wall.

The fold may extend radially across the annular groove, at an elevation between the bottom and top of the groove or the elevation of the fold may be more than half the height of the groove. The annular groove may be interrupted at a location disposed about 180° radially from the fold location to thereby form a hinge which is of the same general elevation as the base. The fold may have on each side shoulders which respectively slope downwardly to the base of the V-shaped annular groove on each side of the fold.

The score may be curved and have a radius of curvature and a centrepoint which are substantially the same as the radius of curvature and centrepoint of the bottom of the V-shaped annular groove. The fold may be at an elevation of about 75 percent of the height of the V-shaped groove. The shoulders on each side of the fold may be at about a 45° angle to the base.

The two walls of the V-shaped groove may be at about a 45° angle to the base to give an included angle of about 90°. Alternatively, the inboard wall of the V-shaped groove may be at a 45° angle to the base and the outboard wall may be at a 60° angle to the base to give an included angle of 105°. The score may have a "U"-shaped cross-section. The release vent may include a hinge which tends to focus release forces at the fold and score.

DRAWINGS

In drawings which illustrate specific embodiments of the invention, but which should not be construed as restricting the spirit or scope of the invention in any way:

DETAILED DESCRIPTION OF SPECIFIC EMBODIMENTS OF THE INVENTION

Figure 1:
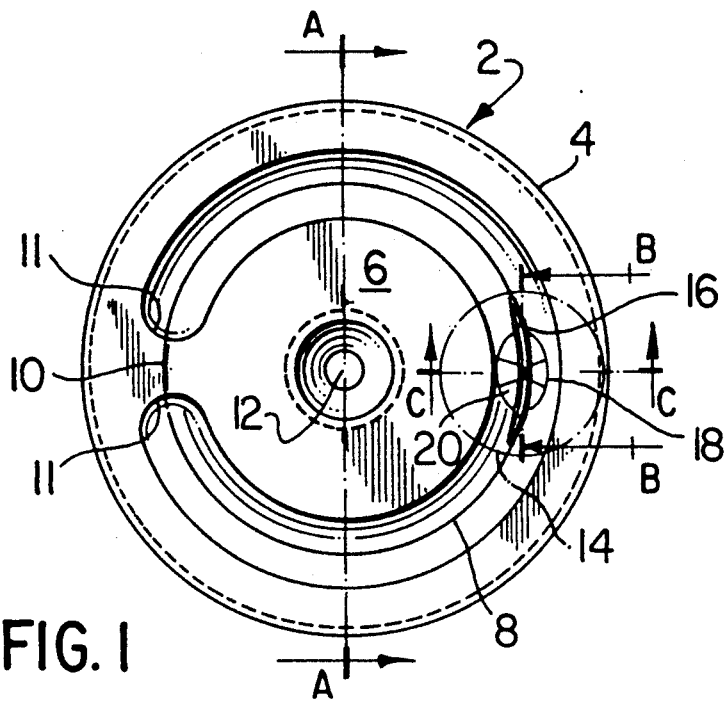
FIG. 1 illustrates a plan view of the bottom of a container casing.

Referring to the drawings, FIG. 1 illustrates a plan view of the base of a container incorporating the applicant's novel pressure vent design. Specifically, FIG. 1 illustrates a hollow container constructed of a cylindrically shaped container wall 4, which melds with a generally planar circular container base 6 to form a cup. While not shown in FIG. 1, or elsewhere, the end of the container opposite base 6 is closed with a circular disk which mates with the wall 4 to provide a closed container. An interrupted annular groove 8 is formed inboard of the container wall 4 and is circumscribed about a centre point 12 of the circular planar container base 6. The annular groove 8 is interrupted at one point by a hinge 10, which lies in the same plane as the main part of container base 6. The facing ends 11 of the grooves 8 on each side of the hinge 10 are smoothly rounded.

A vent 14 is disposed in the annular groove 8 opposite to hinge 10. Vent 14 is denoted by a circled area. The hinge 10 serves to focus internal vent forces at the vent 14. Vent 14 is comprised of a curved score 16, which transverses flat-topped fold 18 and adjacent shoulders 20 which slope downwardly on each side of fold 18, to the bottom of groove 8. Fold 18 extends radially across groove 8 at an elevation below the top of the two sides of the groove. The flat portion of the fold is approximately twice as long as it is wide.

Figure 2:
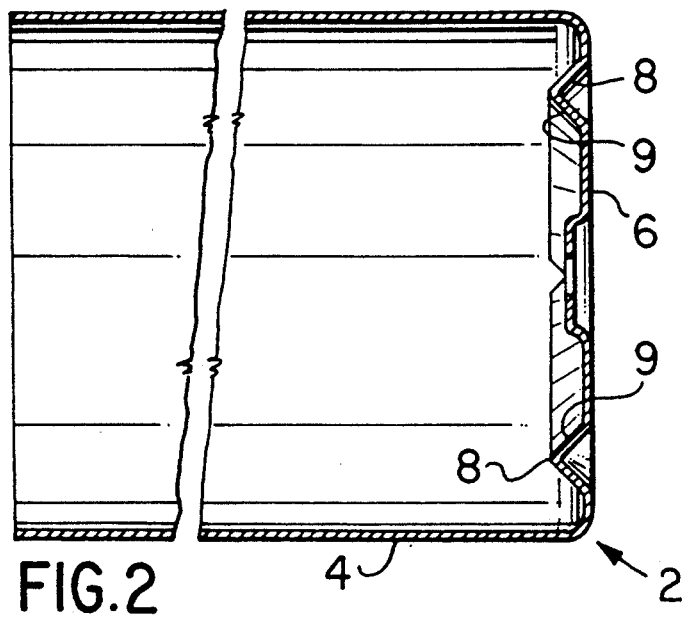
FIG. 2 illustrates a section view taken along section line A—A of FIG. 1.

FIG. 2 illustrates a section view taken along section line A—A of FIG. 1. The container 2 is essentially in the form of a hollow cup formed by cylindrical container wall 4, and generally planar container base 6. As can be seen in FIG. 2, groove 8 has a generally "V" shape, with sloping walls 9 on each side. As seen in FIG. 2, the centre point 12 is a depression formed in base 6, although this is not mandatory for the overall design of the pressure vent. Centre point 12 can be punctured to accommodate a positive or negative pole or receive a fill-tube, when the container 2 is used to enclose the operating components of a lithium-sulfur dioxide battery.

Figure 3:
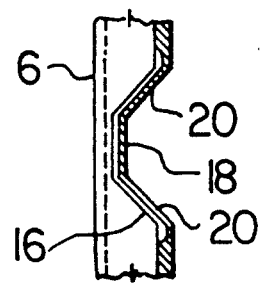
FIG. 3 illustrates a section view taken along section line B—B of FIG. 1.

Referring to FIG. 3, which illustrates a section view taken along section line B—B of FIG. 1, the construction and depth of the score 16 is illustrated in detail. The score 16 is formed in the planar circular container base 6 before groove 8 is stamped into the base 6. When score 16 is stamped in base 6, before the formation of groove 8, the depth of score 16 is typically about 60 percent of the thickness of base 6. The two ends of the score 16 extend beyond the two shoulders 20 where they meet groove 8 and are sloped upwardly about 10° in order to avoid any sharp corners, which may be vulnerable as active corrosion sites. Avoiding sharp edges also contributes to longer die wear, since sharp edges require sharp dies. This leads to improved quality control, and longer die wear.

When groove 8, and flat-topped fold 18 are stamped in base 6, then the depth of the score 16 is altered and reduced somewhat. The depth of the score 16 is less on the shoulders 20, due to the more extensive drawing action. As can be seen in FIG. 3, flat-topped fold 18 is set at an elevation intermediate the bottom of groove 8 and base 6. FIG. 3 also shows shoulders 20 sloping downwardly at 45° angles from each side of the crest of fold 18. It has been determined that a 45° angle for the slope of shoulders 20 represents one embodiment of the invention in which an intermediate venting pressure is achieved. If the shoulders are steep, then the vent tends to be strong and high pressures are required to rupture score 16 of the vent. On the other hand, if the slope of shoulders 20 is gradual, the vent construction tends to deform more easily under pressure and lower venting pressures are achieved.

Figure 4:
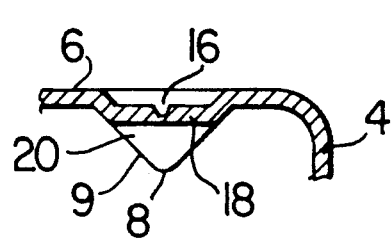
FIG. 4 illustrates a section view taken along section line C—C of FIG. 1.

FIG. 4 illustrates a section view taken along section line C—C of FIG. 1. This section view illustrates the construction of the vent 14 from another direction. Score 16 is shown formed in flat-topped fold 18. It should be noted that score 16 does not have a sharp "V" shape but has a sharp cornered "U" shape. This shape promotes die longevity, and improves quality control. A flat bottomed score 16 is not as likely as a sharp bottomed score to penetrate too deeply into the thickness of fold 18, or specifically, base 6, since the score 16 is formed in base 6 before flat-topped fold 18, and shoulders 20, and groove 8 are formed in the base 6. FIG. 4 illustrates the "V" shape of groove 8 and adjacent groove walls 9. Generally, groove walls 9 will be arranged to have a 90° included angle. It has been found as a general rule that a 45° slope for each groove wall 9, especially for large batteries, represents a good compromise between forming a groove which is too strong, and a groove which is too weak. In certain situations, for example, with smaller batteries, a weaker vent may be required. In that case, the angle of the inboard side of the groove can be 45° while the angle of the outboard groove can be 60°, to give an included angle of 105°. Other angles are also possible as required to suit given conditions.

It is useful for packaging and use applications to have base 6 which retains its generally planar shape and does not bulge significantly when pressure builds up in container 2. Thus several batteries can be conveniently arranged end to end without bulging bases. It can also be seen in FIG. 4 that base 6 is curved so that it melds smoothly into container wall 4.

Curved score 16, when it is formed in base 6 prior to formation of the annular groove 8 has a radius which is identical to the bottom of "V"-shaped groove 8. The applicant has determined that if the score 16 is formed slightly outboard of the bottom of groove 8, the vent 14 performs reasonably well and releases at predetermined pressures. However, if score 16 is significantly inboard, it has been found that the pressure vent will not release within a tolerable range of prescribed pressure levels. It has been determined by extensive experimentation that a curved score 16, which has a radius essentially identical to the base of groove 8, provides consistent ventability when predetermined gas pressures are generated in the container 2. Further, score 16 with the curved orientation tends to create a larger opening when ruptured. The flat-topped fold, as opposed to a sharp crested fold, also contributes to the formation of a larger vent hole upon rupture. This leads to better gas pressure release. Also, the relatively large opening that is formed on rupture is not as likely to be plugged by debris such as battery salts, which are expelled when the vent is ruptured.

A design objective of the applicant's vent 14 is to provide a vent which will release consistently, within a relatively small pressure range, at pressures well below 450 psig. Another objective is to improve quality control so that wide swings in the pressure release point of the vent 14 are not experienced. A further objective is to promote long die life by minimizing sharp corners and edges. This is done by providing a vent design which is not vulnerable to minor variations in dimensional tolerance. The vent 14 tends to rupture along the curved score 16 because when score 16, and fold 18, are formed in base 6, the forming process hardens and thins the metal in the container base 6 at these locations, thereby leading to a predetermined vulnerability location.

The applicant's pressure vent design has been designed to meet U.S. Army specifications which require that a lithium-sulfur dioxide battery must vent at temperatures of about 150° C. and must not vent at temperatures less than about 90° C. It is important in lithium-sulfur dioxide batteries that the melting point of lithium, which is 187° C., is not reached. Molten lithium is a highly hazardous material, especially when exposed to oxygen and is susceptible to explosion.

The applicant's container 2 with pressure vent 14 is formed from a large planar metal disk by standard metal drawing techniques. This disk can typically be formed of chromium, nickel plated mild steel, or stainless steel. The disk is drawn into a cup of predetermined depth and radius. The curved score 16 is stamped in the base 6 of the cup-shaped container 2 at the location where the groove 8 will be stamped. Then, the interrupted annular groove 8 is stamped in the base. The location and arc of the curved score 16 conforms with the bottom of curved annular groove 8. Flat-topped fold 18 and adjacent shoulders 20 are formed at the same time as the formation of groove 8. Then, if required, a hole can be pierced at centre point 12.

It has been determined through experimentation that the applicant's pressure vent design utilizing a metal thickness of about twenty one-thousandths of an inch consistently releases at pressures in the range of about 350 psig ± 25 psig. This is a higher quality control standard than is generally possible with the design disclosed and claimed in U.S. Pat. No. 4,610,370. A safer more reliable pressure vent is produced.

TABLE I

Incorporate new vent design that (a) opens within the temperature range required for fresh cells under external heating and (b) opens wide enough to effectively shut down fresh and partially discharged cells when short circuited.
Fill Tube Method Vent Test
Old Style Sentec Cans

| Can No. | Vent Pressure (psig) |
|---------|----------------------|
| 1 | 300 |
| 2 | 310 |
| 3 | 320 |
| 4 | 360 |
| 5 | Fill tube weld |
| 6 | 320 |
| 7 | 310 |
| 8 | 320 |
| 9 | 340 |
| 10 | 300 |
| 11 | 580 |
| 12 | 300 |
| 13 | 300 |
| 14 | 320 |
| 15 | 600 |
| 16 | 310 |
| 17 | 310 |
| 18 | 320 |
| 19 | 320 |
| 20 | 310 |
| 21 | 310 |
| 22 | 300 |
| 23 | 310 |
| 24 | 310 |
| 25 | 340 |
| 26 | 320 |
| 27 | 300 |

TABLE I-continued

Incorporate new vent design that (a) opens within the temperature range required for fresh cells under external heating and (b) opens wide enough to effectively shut down fresh and partially discharged cells when short circuited.
Fill Tube Method Vent Test
Old Style Sentec Cans

| Can No. | Vent Pressure (psig) |
| --- | --- |
| 28 | 620 |
| 29 | 310 |
| 30 | 310 |
| 31 | 300 |
| 32 | 310 |
| 33 | 320 |
| 34 | 620 |
| 35 | 315 |
| 36 | 310 |
| 37 | 340 |
| 38 | 380 |
| 39 | 310 |
| 40 | 340 |
| 41 | 315 |
| 42 | 310 |
| 43 | 315 |
| 44 | 310 |
| 45 | 300 |
| 46 | 310 |
| 47 | 280 |
| 48 | 310 |
| 49 | 360 |
| 50 | 320 |
| Ave. | 339.9 |
| SDEV | 81.01 |

Uniformity of Venting Conclusions

The new vent design (BBS PRV) exhibited a standard deviation between 2.5 and 7.0. The prior art design (Patterson, 1985), exhibited a standard deviation of 81.01. Therefore, the new vent design (BBS PRV) is much superior to the prior art vent design.

TABLE II

| Straight vs. Curved Score as Applied to Container Pressure Release Vent (BBS PRV) | | |
| --- | --- | --- |
| Can No. | Curved | Straight |
| 1 | 430 | 410 |
| 2 | 405 | 400 |
| 3 | 410 | 425 |
| 4 | 405 | 430 |
| 5 | 415 | 420 |
| 6 | 410 | 425 |
| 7 | 405 | 420 |
| 8 | 430 | 415 |
| 9 | 415 | 450 |
| 10 | 425 | 450 |
| 11 | 410 | 410 |
| 12 | Spoil | 430 |
| 13 | 410 | 450 |
| 14 | 425 | 490 |
| 15 | 420 | 420 |
| Ave. = 415.36 | | Ave. = 429.67 |
| SDEV = 9.086 | | SDEV = 22.47 |

*Curved groove .0106 in. deep
Straight groove .0105 in. deep

This data demonstrates that the curved score (groove of the new design gives a much tighter vent range.

Wall Thickness Under Score (Under Groove) vs. Vent Pressure

Figure 5:
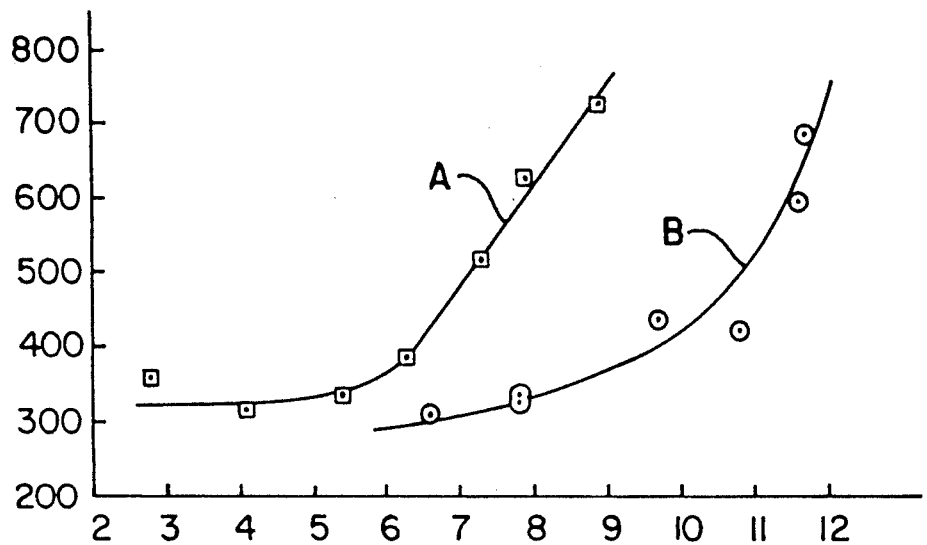
FIG. 5 illustrates a graph of vent pressure, psi, relative to wall thickness under the groove (total thickness minus groove depth) for two prior art cases.
Figure 6:
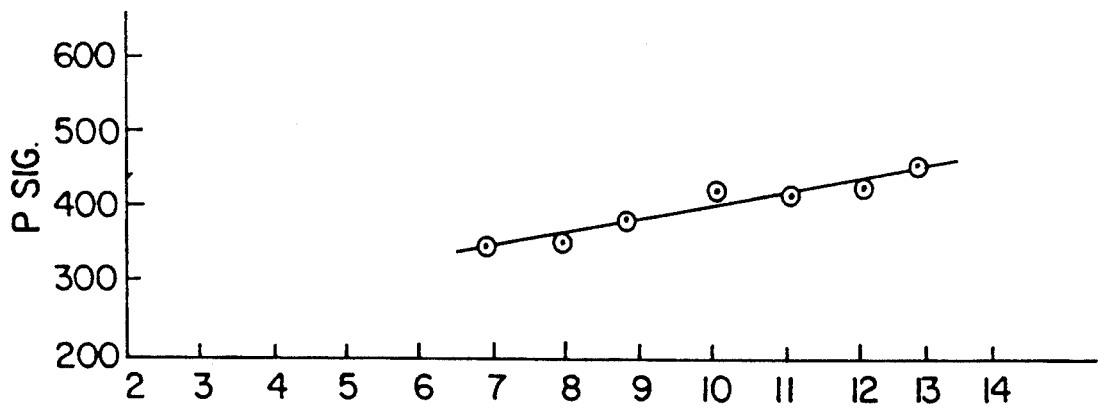
FIG. 6 illustrates a graph of vent pressure, psi, relative to wall thickness under the groove (total thickness minus groove depth) for the new vent design (BBS PRV)
Figure 7:
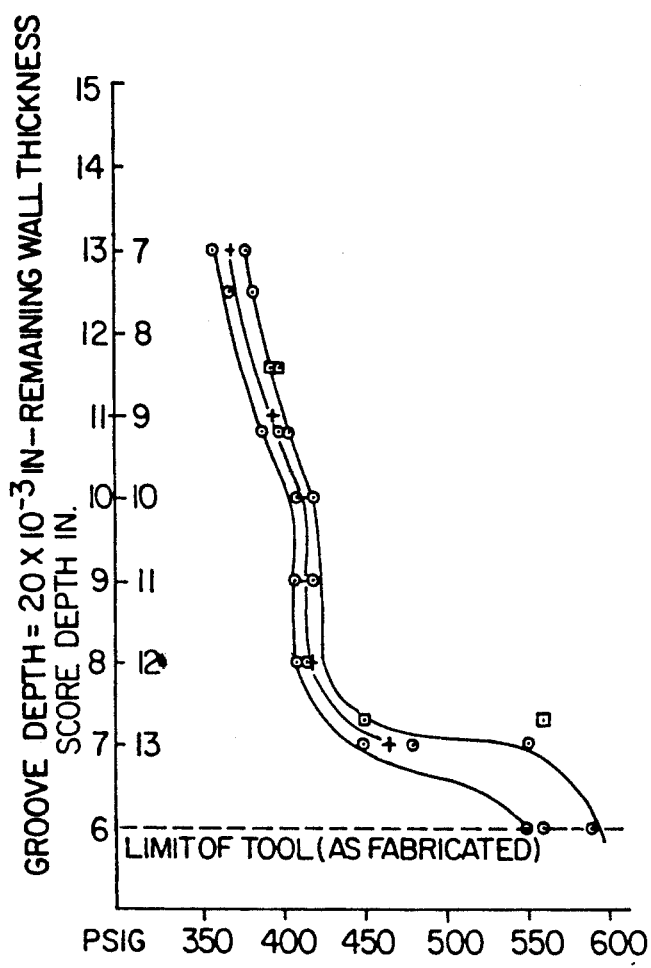
FIG. 7 illustrates a graph of groove depth vs. venting for the new vent design.

FIG. 5 shows the effect of wall thickness under the score (total thickness—(score) groove depth) on vent pressure for old vent designs. The graph in FIG. 6 shows the equivalent relationship for the new vent design, according to the invention. FIG. 7 illustrates a graph of score (groove) depth vs. venting for the new vent design (BBS PRV).

Comparison of the three graphs shows that the new vent design (designated BBS PRV) has a tighter venting range. The advantage of this is that vent pressure is not as dependent upon tool wear, as previous designs. Therefore a given set of tools should have a longer useful life.

Deformation vs. Applied Pressure

Figure 8:
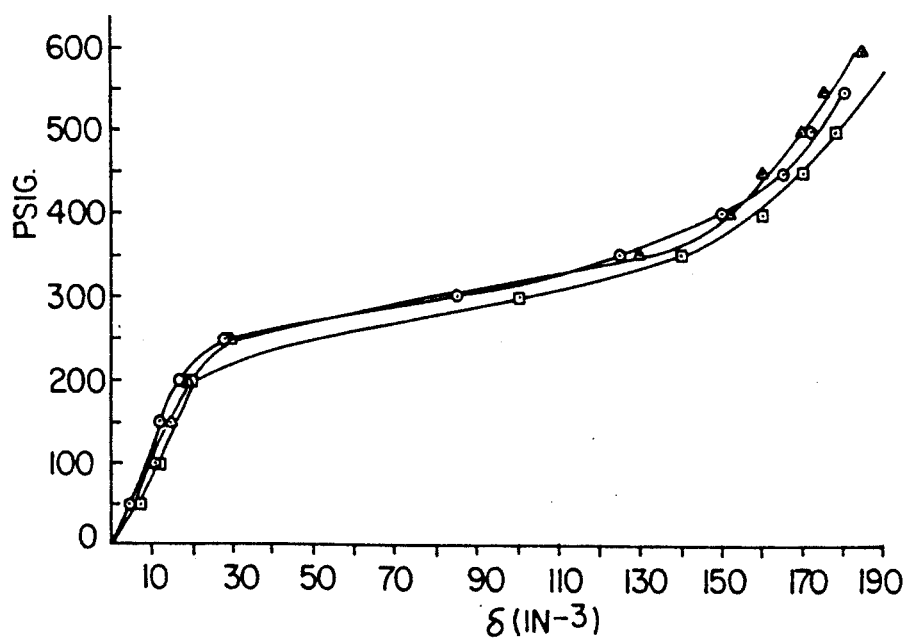
FIG. 8 illustrates a graph of pressure (psig) vs. wall deformation for the prior vent design (Patterson, 1985)
Figure 9:
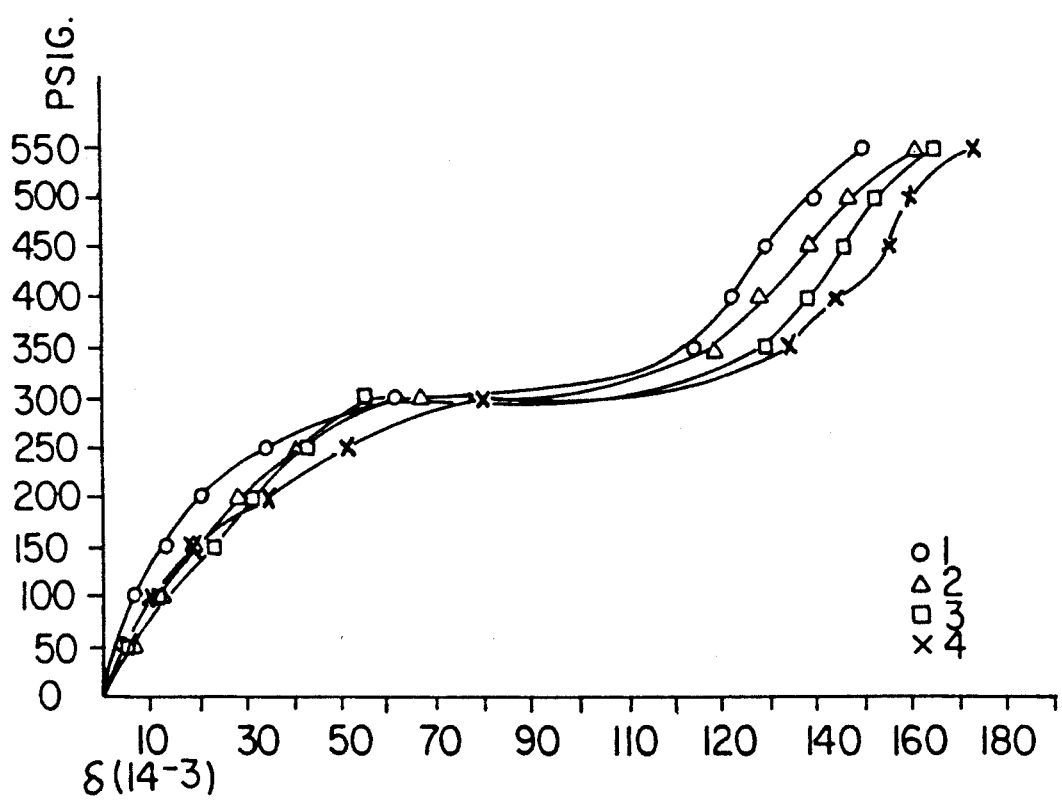
FIG. 9 illustrates a graph of pressure (psig) vs. wall deformation for the new vent design (BBS PRV).

The last two graphs (FIGS. 8 and 9) show equivalent functions for the old and new vent designs. The new vent design (BBS PRV) shows a distinctly flatter section (the flatter the curve, the more rapid the deformation) than the prior art vent design. Since the width of opening (rupture width) is proportional to the rate of deformation, the flatter region on the graph demonstrates that a greater rate of deformation contributes to a larger rupture in the can.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

I claim:

1. A pressure release vent for a container comprising:
   (a) a container having a cylindrical wall and at one end thereof a circular planar base the periphery of which joins with the edge of the cylindrical wall around its circumference;
   (b) an indentation formed in the circular base, the indentation being in the form of an annular groove located radially inward of the periphery of the circular base, the groove having a generally V-shaped cross-section, the indentation being interrupted by a flat-topped fold which extends radially across the annular groove; and
   (c) a curved score formed in he flat top of said fold, the curved score being positioned on the flat top of the fold at a distance radially equal to the radial distance of the base of the generally V-shaped cross-section groove from the center point of the circular base, each side of the curved score being concentric and having a center of radius identical to the radius of the V-shaped cross-section annular groove, the curved score providing a point of weakness whereby excessive pressure build up in the container ruptures the circular base at the score location.

2. A pressure release vent as claimed in claim 1 wherein the elevation of the fold is at more than half the height of the groove.

3. A pressure release valve as claimed in claim 2 wherein the annular groove is interrupted at a location disposed about 180° radially from the fold location to thereby form a hinge which is of the same general elevation as the base.

4. A pressure release vent as claimed in claim 3 wherein the fold has on each side thereof shoulders which respectively slope downwardly to the base of the V-shaped annular groove on each side of the fold.

5. A pressure release vent as claimed in claim 4 wherein the fold is at an elevation of about 75 percent of the height of the V-shaped groove.

6. A pressure release vent as claimed in claim 5 wherein the shoulders on each side of the fold are at about a 45° angle to the base.

7. A pressure release vent as claimed in claim 5 wherein the two walls of the V-shaped groove are at about a 45° angle to the base, to form an included angle of about 90°.

8. A pressure release vent as claimed in claim 5 wherein the radially inward wall of the V-shaped groove is about 45° and the radial outward wall of the V-shaped groove is about 60°, to form an included angle of about 105°.

9. A pressure release vent as claimed in claim 4 wherein the respective ends of the score extend beyond the two shoulders and are sloped to mate smoothly with the bottom regions of the groove.

10. A pressure release vent as claimed in claim 9 wherein the thickness of the container is about twenty one-thousandths of an inch.

11. A pressure release vent as claimed in claim 4 wherein the length of the flat area of the flat-topped fold is about twice as long as its width.

12. A pressure release vent as claimed in claim 4 wherein the hinge acts to concentrate internal container pressures at the fold and score.

13. A pressure release vent as claimed in claim 1 wherein the score has a "U"-shaped cross-section.

* * * * *